United States Patent
Herzog (10) Patent No.: US 11,295,217 B2
(45) Date of Patent: Apr. 5, 2022

(54) LOCALIZED TEMPORAL MODEL FORECASTING

(71) Applicant: Uptake Technologies, Inc., Chicago, IL (US)

(72) Inventor: James Herzog, Downers Grove, IL (US)

(73) Assignee: Uptake Technologies, Inc., Chicago, IL (US)

( * ) Notice: Subject to any disclaimer, the term of this patent is extended or adjusted under 35 U.S.C. 154(b) by 1600 days.

(21) Appl. No.: 14/996,154

(22) Filed: Jan. 14, 2016

(65) Prior Publication Data

US 2017/0206452 A1    Jul. 20, 2017

(51) Int. Cl.
*G06N 5/04* (2006.01)
*G06N 20/00* (2019.01)

(52) U.S. Cl.
CPC .............. *G06N 5/04* (2013.01); *G06N 5/045* (2013.01); *G06N 20/00* (2019.01)

(58) Field of Classification Search
CPC ......... G06N 5/04; G06N 5/045; G06N 99/005
See application file for complete search history.

(56) References Cited

U.S. PATENT DOCUMENTS

| | | | |
|---|---|---|---|
| 5,566,092 A | 10/1996 | Wang et al. | |
| 5,633,800 A | 5/1997 | Bankert et al. | |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |
| 6,622,264 B1 | 9/2003 | Bliley et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |

(Continued)

FOREIGN PATENT DOCUMENTS

CN    102779223 A    11/2012
WO    2011117570    9/2011

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Tsu-Chang Lee
(74) *Attorney, Agent, or Firm* — Lee Sullivan Shea & Smith LLP (57) ABSTRACT

Disclosed herein are systems, computer-readable media, and methods related to modeling on multivariate time series data overlaid with event data. In particular, some examples involve selecting one or more historical time series data arrays similar to a recent time series data array and filtering the similar historical time series data arrays based on event data. Some examples can also involve training a localized temporal forecasting model using the filtered historical time series data arrays. Some examples can include building and/or training the localized temporal forecasting model at or near a time that a forecast is needed.

20 Claims, 4 Drawing Sheets

(56) References Cited

U.S. PATENT DOCUMENTS

| | | |
|---|---|---|
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,108,243 B2 | 1/2012 | Solotorevsky et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,583,586 B2 | 11/2013 | Ebadollahi et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2003/0220740 A1* | 11/2003 | Intriligator ............... G01W 1/10 |
| | | 702/3 |
| 2004/0024773 A1 | 2/2004 | Stoffel et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2005/0235356 A1 | 10/2005 | Wang |
| 2006/0106797 A1* | 5/2006 | Srinivasa ............... G06N 3/086 |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0059284 A1 | 3/2008 | Solotorevsky et al. |
| 2010/0152910 A1* | 6/2010 | Taft ........................ G01D 4/002 |
| | | 700/286 |
| 2012/0059771 A1 | 3/2012 | von Groll et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1* | 1/2013 | Herzog ............... G05B 23/0283 |
| | | 706/52 |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0081696 A1 | 3/2014 | Salomatin et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0172866 A1* | 6/2014 | Lin ..................... G06F 16/2477 |
| | | 707/741 |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0199413 A1* | 7/2015 | Brown ................ G06F 16/2453 |
| | | 707/602 |
| 2015/0242819 A1 | 8/2015 | Moses et al. |
| 2015/0262060 A1 | 9/2015 | Husain et al. |
| 2015/0347907 A1 | 12/2015 | Mathew et al. |

FOREIGN PATENT DOCUMENTS

| | | |
|---|---|---|
| WO | 2013034420 | 3/2013 |
| WO | 2014145977 | 9/2014 |
| WO | 2014178877 | 11/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

(56) References Cited

OTHER PUBLICATIONS

Infor Equipment for Rental, Infor.com (2013).
Waltermire et al, Applying the Continuous Monitoring Technical Reference Model to the Asset, Configuration, and Vulnerability Management Domains (DRAFT), NIST (Jan 2012).
International Search Report and Written Opinion for Application No. PCT/US2017/013267 dated Apr. 25, 2017, 12 pages.
European Patent Office Extended Search Report for EP Application No. 17738979.8 dated Aug. 14, 2019, 10 pages.
Intellectual Property Office of Singapore , Written Opinion dated Oct. 29, 2019, issued in connection with Singapore Application No. 11201805939Q, filed on Dec. 1, 2017, 7 pages.
Australian Patent Office, Examination Report dated Jan. 27, 2021 issued in connection with Australian Application No. 2017206794, 5 pages.
Chinese Patent Office, First Office Action dated Jul. 15, 2021 issued in connection with Chinese Application No. 201780009275.3, 15 pages.

\* cited by examiner

LOCALIZED TEMPORAL MODEL FORECASTING

BACKGROUND

Temporal forecasting typically utilizes forecast models trained using all (or most) available data. Models trained for forecasting using all available data may not accurately generate forecasts for a given recent data pattern. Further, some temporal forecasting models may not take into account event data (e.g., data representing an intermittent, asynchronous and/or transient event) and thus may not be able to accurately forecast a near-term system parameter value and/or response when an event is involved.

OVERVIEW

In general, some implementations can include systems, computer readable media, and methods related to model forecasting using multivariate time series data overlaid with event data to train a localized temporal forecasting model. In particular, some examples involve selecting one or more historical time series data arrays similar to a recent time series data array and filtering the similar historical time series data arrays based on event data. Some examples can also involve training a localized temporal forecasting model using the filtered historical time series data arrays. Some examples can include building and/or training the localized temporal forecasting model at or near the time that a forecast is needed (e.g., via a greedy learning technique).

As discussed above, some examples provided herein are related to modeling. In one aspect, a computing system is provided. The computing system comprises at least one processor, a non-transitory computer-readable medium, and program instructions stored on the non-transitory computer-readable medium that are executable by the at least one processor. When executed, the program instructions can cause the computing system to a) obtain a first time series data array representing a set of one or more parameters associated with a system, and b) identify one or more historical time series data arrays similar to the first time series data array, the one or more historical time series data arrays representing respective past values of the set of one or more parameters. When executed, the program instructions can also cause the computing system to c) obtain first event data associated with the first time series data array and historical event data associated with each of the one or more historical time series data arrays, and d) filter the one or more historical time series data arrays based on a comparison of the first event data and the historical event data associated with each of the one or more historical time series data arrays to obtain one or more filtered historical time series data arrays.

When executed, the program instructions can further cause the computing system to e) train a time series forecast model using the one or more filtered historical time series data arrays, and f) generate a forecast of a future value of at least one parameters of the set of one or more parameters using the trained time series forecast model. In some examples, a)-f) can be repeated based on one of a period of time expiring or receiving a request to generate a forecast. The program instructions can be further executable by the at least one processor to cause the computing system to detect a temporal change, and, based on the detected change, repeat a) to obtain an updated first time series data array representing the set of one or more parameters at a time subsequent to a time of a previous first time series data array. When executed, the program instructions can also cause the computing system to repeat b)-f) based on the updated first time series data array.

The program instructions can be further executable by the at least one processor to cause the computing system to detect a change in at least one parameters of the set of one or more parameters, and, based on the detected change, repeat a) to obtain an updated first time series data array representing the set of one or more parameters at a time subsequent to a time of a previous first time series data array. When executed, the program instructions can also cause the computing system to repeat b)-f) based on the updated first time series data array.

The program instructions can be further executable by the at least one processor to cause the computing system to transmit the forecast to another system. In some examples, the first event data indicates an event that has occurred at a time of the first time series data array and that is expected to affect behavior of the system subsequent to the time of the first time series data array. The respective historical event data associated with each of the one or more filtered historical time series data arrays may indicate an event similar to the first event.

In yet another aspect, disclosed herein is a non-transitory computer-readable medium having program instructions stored thereon that are executable by at least one processor of a computing system to cause the computing system to a) obtain a first time series data array representing a set of one or more parameters associated with a system, and b) identify one or more historical time series data arrays similar to the first time series data array, the one or more historical time series data arrays representing respective past values of the set of one or more parameters.

When executed, the program instructions can also cause the computing system to c) obtain first event data associated with the first time series data array and historical event data associated with each of the one or more historical time series data arrays, and d) filter the one or more historical time series data arrays based on a comparison of the first event data and the historical event data associated with each of the one or more historical time series data arrays to obtain one or more filtered historical time series data arrays.

When executed, the program instructions can further cause the computing system to e) train a time series forecast model using the one or more filtered historical time series data arrays, and f) generate a forecast of a future value of at least one parameters of the set of one or more parameters using the trained time series forecast model. In some examples, a)-f) can be repeated based on one of a period of time expiring or receiving a request to generate a forecast. The program instructions can be further executable by the at least one processor to cause the computing system to detect a temporal change, and, based on the detected change, repeat a) to obtain an updated first time series data array representing the set of one or more parameters at a time subsequent to a time of a previous first time series data array. When executed, the program instructions can also cause the computing system to repeat b)-f) based on the updated first time series data array.

The program instructions can be further executable by the at least one processor to cause the computing system to detect a change in at least one parameters of the set of one or more parameters, and, based on the detected change, repeat a) to obtain an updated first time series data array representing the set of one or more parameters at a time subsequent to a time of a previous first time series data array.

When executed, the program instructions can also cause the computing system to repeat b)-f) based on the updated first time series data array.

The program instructions can be further executable by the at least one processor to cause the computing system to transmit the forecast to another system. In some examples, the first event data indicates an event that has occurred at a time of the first time series data array and that is expected to affect behavior of the system subsequent to the time of the first time series data array. The respective historical event data associated with each of the one or more filtered historical time series data arrays may indicate an event similar to the first event.

In yet another aspect, disclosed herein is a computer-implemented method including a) obtaining a first time series data array representing a set of one or more parameters associated with a system, and b) identifying one or more historical time series data arrays similar to the first time series data array, the one or more historical time series data arrays representing respective past values of the set of one or more parameters.

The method can also include c) obtaining first event data associated with the first time series data array and historical event data associated with each of the one or more historical time series data arrays, and d) filtering the one or more historical time series data arrays based on a comparison of the first event data and the historical event data associated with each of the one or more historical time series data arrays to obtain one or more filtered historical time series data arrays. The method can further include e) training a time series forecast model using the one or more filtered historical time series data arrays, and f) generating a forecast of a future value of at least one parameters of the set of one or more parameters using the trained time series forecast model.

In some examples, the method can also include detecting a temporal change, and based on the detected change, repeating a) to obtain an updated first time series data array representing the set of one or more parameters at a time subsequent to a time of a previous first time series data array. The method can further include repeating b)-f) based on the updated first time series data array.

In some examples, the method can also include detecting a change in at least one parameter of the set of one or more parameters, and based on the detected change, repeating a) to obtain an updated first time series data array representing the set of one or more parameters at a time subsequent to a time of a previous first time series data array. The method can further include repeating b)-f) based on the updated first time series data array.

The method can also include repeating a)-f) based on one of a period of time expiring or receiving a request to generate a forecast. The first event data can indicate an event that has occurred at a time of the first time series data array and that is expected to affect behavior of the system subsequent to the time of the first time series data array. The respective historical event data associated with each of the one or more filtered historical time series data arrays can indicate an event similar to the first event.

One of ordinary skill in the art will appreciate these as well as numerous other aspects in reading the following disclosure.

DETAILED DESCRIPTION

Figure 1:
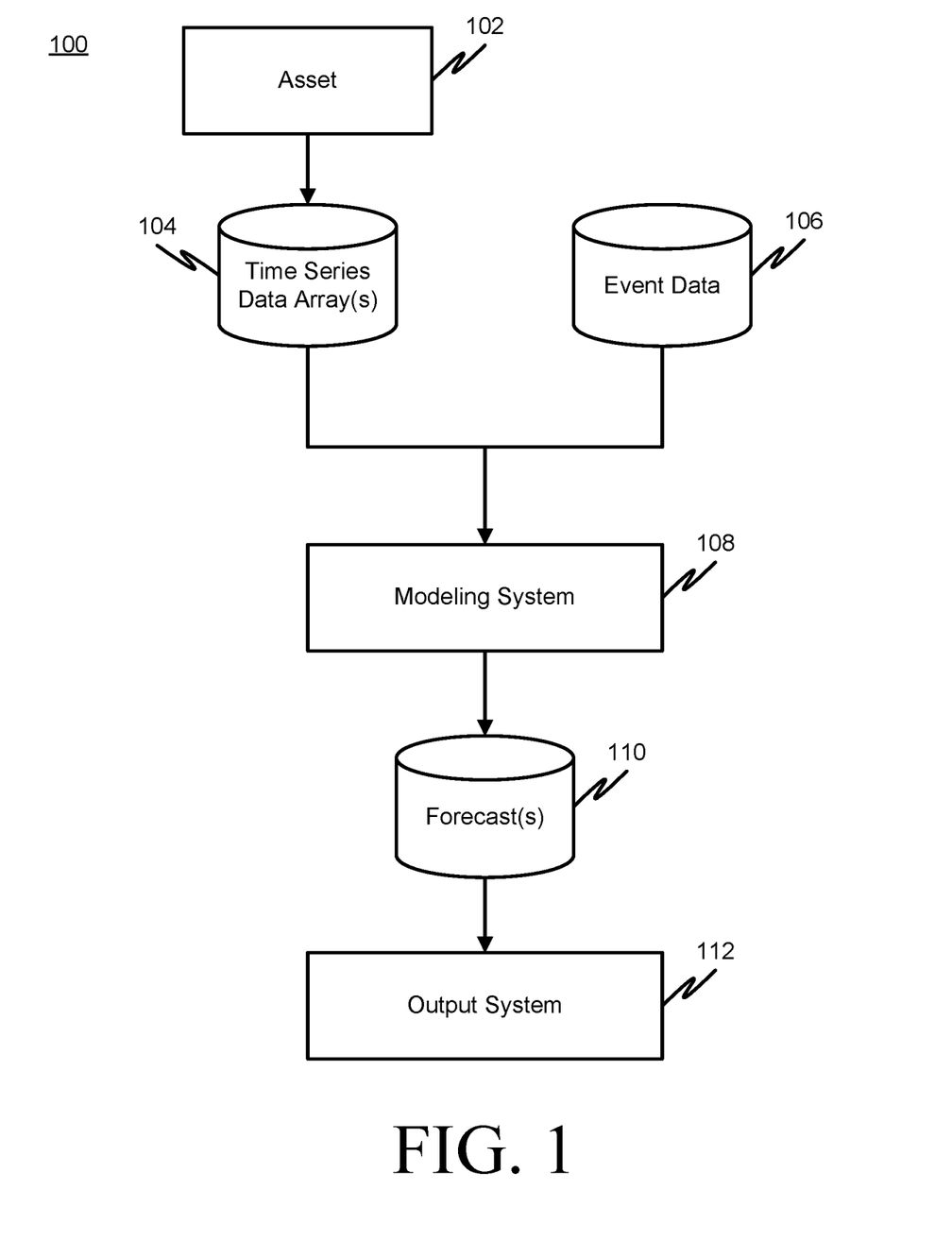
FIG. 1 is a diagram of an example localized temporal modeling environment in accordance with at least one implementation.

FIG. 1 is a diagram of an example modeling environment 100 in accordance with at least one implementation. The environment 100 includes one or more assets 102, a modeling system 108, and an output system 112. Example assets may include transportation machines (e.g., locomotives, aircrafts, passenger vehicles, semi-trailer trucks, ships, etc.), industrial machines (e.g., mining equipment, construction equipment, factory automation, etc.), medical machines (e.g., medical imaging equipment, surgical equipment, medical monitoring systems, medical laboratory equipment, etc.), utility machines (e.g., turbines, solar farms, etc.), among other examples. An asset may also include a healthcare facility or other type of facility employing personnel. In example implementations, the assets may each be of the same type (e.g., a fleet of locomotives or aircrafts, a group of wind turbines, or a set of MRI machines, among other examples) and perhaps may be of the same class (e.g., same brand and/or model). In other examples, the assets may differ by type, by brand, by model, etc. Those of ordinary skill in the art will appreciate that these are but a few examples of assets and that numerous others are possible and contemplated herein.

In operation, an asset 102 generates time series data 104 that can be provided to the modeling system 108. The time series data 104 can include data representing one or more variables, signals, parameters and/or covariates associated with a system or systems of the asset at a recent or past point in time or over a recent or past time range. From the time series data 104, the modeling system 108 can extract a first time series data array (e.g., a time series data array from a recent time) and/or one or more historical time series data arrays. The first time series data array can include the time series data representing a set of one or more parameters of a system from a recent period (or window) of time (e.g., a given number of data samples from one minute ago, etc.). The time series data 104 can be stored by modeling system 108.

In addition to the time series data 104, event data 106 can be provided to the modeling system 108. The event data 106 can be provided by the asset 102, or another system. The event data 106 can include first event data (e.g., representing an event from a time of the first time series data array) and historical event data. The event data 106 can include data corresponding to one or more time-dependent discrete intermittent events, asynchronous events, random events, and/or repeating events (e.g., time, day of week, date, holiday, etc.).

In some examples, prior to training the model, the forecasting modeling technique may be selected along with which parameters (or signals) of a system are to be used for modeling. Any forecasting technique that utilizes a model to predict future values based on previously observed values may benefit from the disclosed subject matter. Generally, the types of modeling technology that utilize past data to predict future outcomes are regression modeling techniques. These include, but are not limited to, kernel regression, similarity-based modeling, Gaussian processes, recurrent neural networks, support vector regression, and autoregressive techniques; such as autoregressive moving average (ARMA), autoregressive integrated moving average (ARIMA), and vector autoregression (VAR). In some examples, the size of the time window (e.g., number of samples) used for modeling is selected. In some examples, a time into the future the forecast is to be generated is selected. The modeling system 108 can train a forecasting model using the time series 104 data in conjunction with the event data 106. For example, the modeling system 108 can identify one or more historical time series data arrays that are similar to the first time series data array. The identified similar historical time series data arrays can be filtered based on the event data. For example, the filtered historical time series data arrays can include only those historical time series data arrays having an associated historical event similar to the first event. The filtered historical time series data arrays can be used to train the forecasting model. Some implementations may provide an advantage of generating a more accurate forecast based on a model trained with historical time series data similar to recent time series data filtered using event data.

The modeling system 108 can generate a forecast 110 using the trained forecasting model. The forecast 110 can represent a future value of one or more parameters of the system being modeled and can include one or more values of one or more variables, signals, parameters of the system being modeled at a future point in time or over a future time range. The variables, signals, and/or parameters of the forecast can be the same as or different than the variables, signals, parameters and/or covariates of the time series data.

The forecast 110 can be provided to an output system 112. The output system 112 can be the same as or different from the asset 102. Further, the asset 102, the modeling system 108 and the output system 112 can be contained in the same system or one or more different systems. The output system 112 can generate an output based on the forecast 110.

For example, a model may be configured to forecast the future behavior of critical systems on a remote transportation device such as a diesel locomotive. Such critical systems may include, but are not limited to, the diesel engine, engine coolant, traction motor, and AC generator systems. The time series data may include data from sensors on the locomotive that are transmitted at regular intervals via a telemetry device. The event data may consist of event codes generated by the control system on the locomotive and transmitted by the same or a different telemetry device. An event code may consist of a unique integer that identifies a specific set of anomalous conditions detected by the control system. An event code may include additional data such as sensor measurements collected coincident with the detection of anomalous conditions. The modeling system 108 can generate a forecast of future behavior of at least one critical system on the locomotive. By overlying event data with time series data, the modeling system 108 may generate a forecast of the critical system that may be more accurate than forecasts generated using the time series data only.

In another example, a model may be configured to forecast the electrical power output of a wind turbine. The time series data may include parameters of the wind turbine. The event data may include meteorological forecast data. The modeling system 108 can generate a forecast of future electrical power output of the wind turbine. By overlying event data with time series data, the modeling system 108 may generate a forecast of total power output that may be more accurate than forecasts generated using conventional techniques. The forecast of total power output may be used by an energy trader to aid in trading the electrical power generated by the turbine on the energy market. For instance, the more accurate forecast may permit an energy trader to obtain a higher price for the electrical power generated by the turbine.

In another example, the asset may be a healthcare facility. The modeling system 108 can be configured to forecast an estimated staffing need of the health care facility. The estimated staffing need can be used to schedule personnel for work at the healthcare facility.

Figure 2:
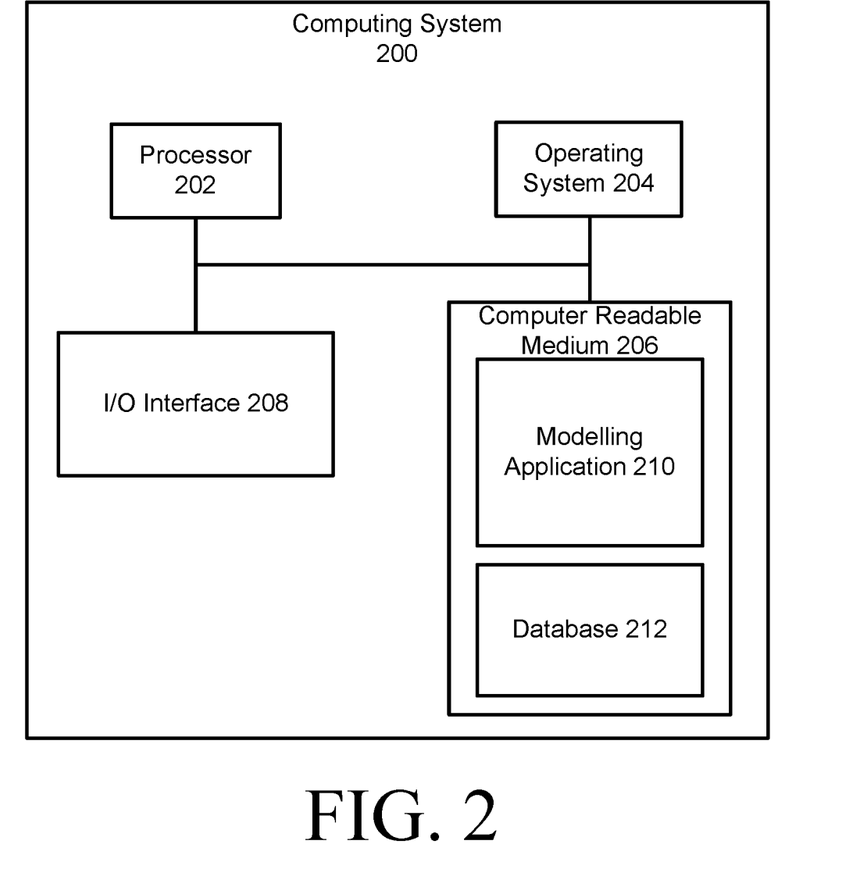
FIG. 2 is a diagram of an example computing system configured to generate a forecast based on localized temporal modeling in accordance with at least one implementation.

FIG. 2 is a diagram of an example computing system 200 configured for modeling (e.g., localized temporal model forecasting) in accordance with at least one implementation. Specifically, the example computing system 200 can include the modeling system 108 shown in FIG. 1. The computing system 200 includes a processor 202, an operating system 204, a computer readable medium 206 and an I/O interface 208. The computer readable medium 206 can include a modeling application 210 (e.g., a localized temporal model forecasting application) and a database 212 (e.g., configured to store time series data, event data, forecasts, etc.).

In operation, the processor 202 may execute the application 210 stored in the computer readable medium 206. The application 210 can include software instructions that, when executed by the processor 202, cause the processor 202 to perform operations for localized temporal model forecasting in accordance with the present disclosure (e.g., performing one or more of steps 302-314 and/or 402-406 described below). The application program 210 can operate in conjunction with the database 212 and the operating system 204. The application 210 can include one or more models.

A modeling system (e.g., 108) can include, but is not limited to, a single processor system, a multi-processor system (co-located or distributed), a cloud computing system, or a combination of the above. In some implementations, the modeling system (e.g., 108) may be included in an asset (e.g., 102) and/or an output system (e.g., 112).

A modeling system (e.g., 108) can include, but is not limited to, a server, a desktop computer, a laptop computer, a portable computer, a tablet computing device, or an information system of a vehicle or the like. In some implementations, the modeling system 108 and the asset 102 and/or the output system 112 may be the same system.

In some examples, a modeling system (e.g., 108) can be connected to an asset 102 and/or output system 112 via a network. The network can be a wired or wireless network, and can include, but is not limited to, a WiFi network, a local area network, a wide area network, the Internet, or a combination of the above.

The storage, memory and/or computer readable medium of a modeling system can include one or more non-transitory computer readable storage media, such as optical, magnetic, organic, or flash memory, among other examples. The software instructions can also be contained in, and provided as, an electronic signal, for example in the form of software as a service (SaaS) delivered from a server (e.g., a distributed system and/or a cloud computing system).

Figure 3:
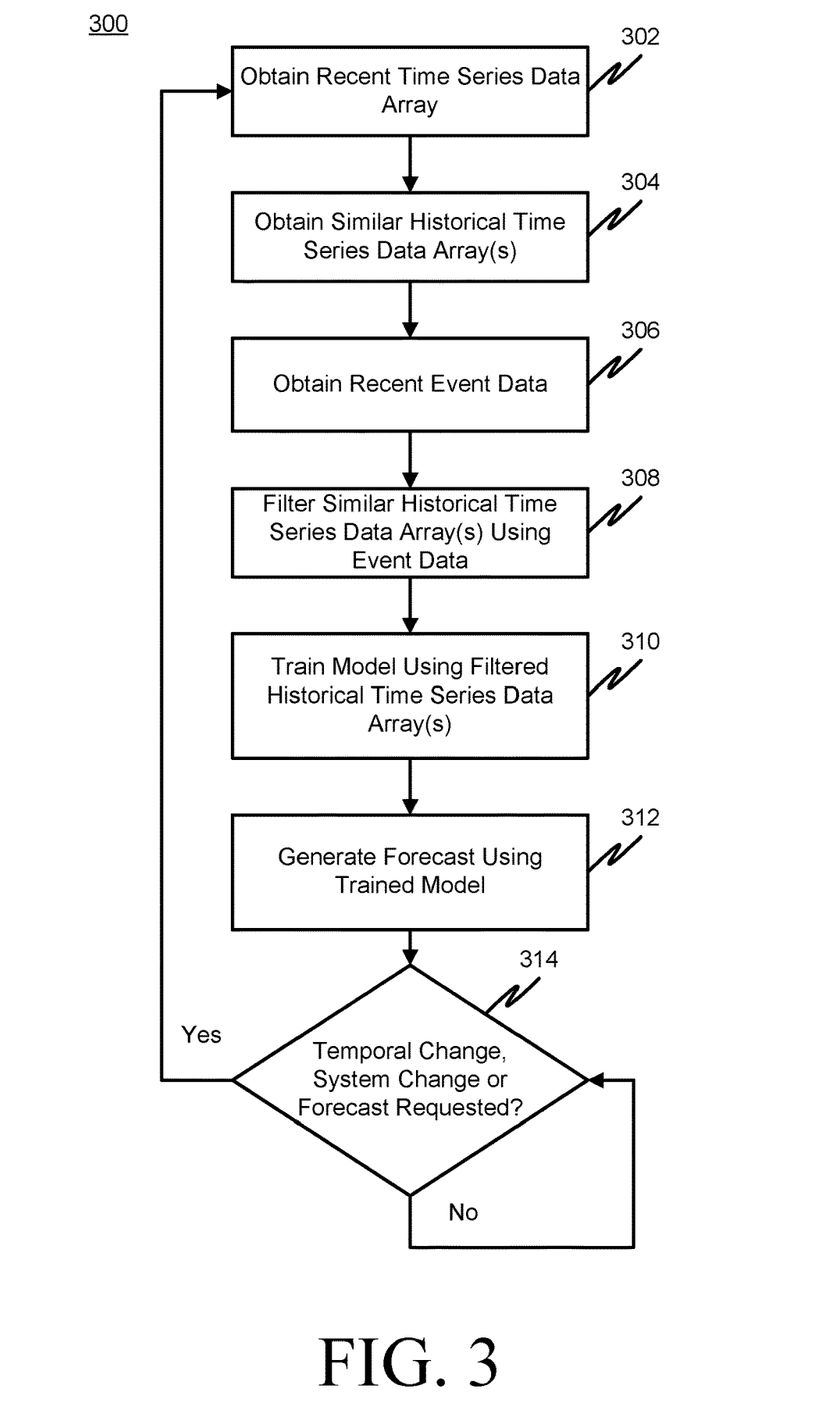
FIG. 3 is a flowchart of an example method for localized temporal modeling in accordance with at least one implementation.

FIG. 3 is a flowchart of an example method 300 for modeling in accordance with at least one implementation. Processing begins at 302, where a modeling system (e.g., 108) obtains a recent time series data array representing the values of one or more parameters of a system at a recent time. The recent time series data array can be from any time (or time range) in the recent past. For example, in the case of systems that operate on a time scale of hours, the recent time series data array may be from a time within the past one or more hours. In another example, some systems may operate on a smaller time unit scale (e.g., seconds or sub-seconds) and the recent time series data array from those systems may be from a time within the past one or more minutes. In yet another example, a system may operate on longer time units (e.g., days) and the recent time series data arrays for such a system may be from a time within the past one or more days. The recent time series data array can be for a point in time or a time range. In the case of a time range, the time series data array may contain data from multiple points in time that occur within the time range. In one example, "obtaining" the array can include creating the array from the incoming data at the modeling system. In another example, "obtaining" the array can include receiving the array from a system external to the modeling system. Processing continues to 304.

At 304, the modeling system (e.g., 108) searches one or more historical time series data arrays to identify historical time series data arrays that are similar to the recent time series data array. The historical time series data arrays can include data representing respective values of the variables, signals, parameters and/or covariates of the recent time series data array at various respective times in the past.

If the recent time series data array consists of a cross section of variable values from a single point in time, then the time series data forms a vector or pattern. There are numerous methods available that can be used to determine whether the contents of recent time series vector is similar to an historic time series vector. The most common of these methods is based on the vector norm and provides a measure of the distance between two vectors. These methods include, but are not limited to, Euclidean distance, p-norm distance, city-block distance, Minkowski distance, Mahalanobis distance, and Hamming distance. In principle, any function of two vectors which produces a scalar measure can be used to determine the similarity between two vectors. Such vector functions include kernel functions, covariance functions, correlation coefficient and similarity operators. A distance or vector function is used to compare the recent time series vector to all historical time series vectors 104. The resulting distances or scalar measures are sorted and scanned to identify a specific number or fraction of the historical time series vectors that are most similar to the recent time series vector.

If the recent time series data array consists of a group of data vectors or patterns from multiple points in time, then a two-step calculation can be used to determine the similarity between the recent time series array and an historic time series array. In the first step, each of the vectors in the recent time series data array is compared to a corresponding vector in the historic time series array. Correspondence of the vectors in the two arrays depends on how the arrays are organized. Assuming the two arrays are time-ordered with the same number of vectors spanning the same time range, then correspondence can be determined by the relative order of the data vectors within time series array, matching the first vector of array A with the first in array B, and so on through the vectors in the arrays. If the arrays contain differing numbers of vectors or span different time ranges, then the timestamps (i.e., the points in time at which the data were collected) of the vectors are used to determine the best correspondence between the vectors. This is accomplished by determining the offset of each of the vectors in the arrays, namely the difference between each vector's timestamp and the timestamp of the first (most recent) vector in the array. The offsets of the recent time series vectors are compared to the offsets of historic time series vectors to find the best matches between the vectors in both arrays. Once each of the vectors in the recent time series arrays has been matched to a vector in the historic time series array, then the similarity between each of the vector pairs is calculated using either a distance or vector function described above. In the second step, the values for each of the vector pairs are combined using a statistic, such as mean, median, or maximum value, to provide a scalar measure of similarity between the two arrays. Using the two-step calculation, the recent time series array is compared to all historical time series arrays 104 and the resulting array comparison measures are sorted and scanned to identify a specific number or fraction of the historical time series arrays that are most similar to the recent time series array.

In the two-step process detailed above, the data in the two arrays are first analyzed cross-sectionally, comparing the data at the same relative points in time; and then in the second step the data are analyzed longitudinally across the range of time spanned by the arrays. Other variations, such as performing the longitudinal step prior to the cross-sectional step can be used to determine whether the data in two arrays are similar. In additional, matrix operations, such as the sequential kernel function of U.S. Pat. No. 8,620,853, can be used to determine whether the data in two arrays are similar.

At 306, the modeling system (e.g., 108) obtains recent event data. Event data may indicate the occurrence of events that may affect near-term transient behavior of one or more parameters of a system (e.g., a system to which the recent time series data array corresponds). Such events may be intermittent, asynchronous, or otherwise localized to particular time points or periods, and may not be reflective of ongoing patterns in system behavior or operating environments. Accounting for the effect of such events may provide a better forecasting model. The event data can include information about the nature or type of transient event (e.g., a type of weather event, a type of man-made event, etc.). Processing continues to 308.

At 308, one or more historical time series data arrays are selected. The historical time series data arrays can be selected based on a combination of identifying historical time series data arrays similar to the recent time series data array and then filtering the similar historical time series data arrays using event data of the historical time series data arrays. The historical event data can be obtained from the same source as the historical time series data or from a different source. The historical time series data array selection process is described below in greater detail in connection with FIG. 4. Processing continues with 310.

At 310, modeling system (e.g., 108) trains a model (e.g., a localized temporal model) based on the filtered historical time series data arrays. Processing continues to 312.

At 312, the modeling system (e.g., 108) generates a forecast using the trained localized temporal model. In some examples, the model can generate the forecast without further input and in other examples, the model may require input such as the recent time series data array to generate a forecast. The forecast can represent a predicted value of one or more of the variables, signals, and/or parameters of the recent time series data array at a future time or time range. The forecast can be provided to one or more other systems (e.g., another system internal or external to the modeling system). For example, the forecast can be a prediction of the expected behavior of signals from a critical system on the locomotive. In another example, the forecast can be a prediction of power output of a wind turbine at a time or time range in the future. In another example, the forecast can be a prediction of a staffing need at a facility (e.g., a healthcare facility). Processing continues to 314.

At 314, the modeling system (e.g., 108) determines whether a request for a new forecast has been received or whether a temporal change has occurred or a system change has occurred that triggers a retraining of the localized temporal model and generating of a new forecast. For example, if a given amount of time has elapsed since the time represented by the recent time series data array (e.g., a current clock cycle, a current parameter sampling interval or other time period has elapsed), the modeling system (e.g., 108) may retrain the localized temporal model to the current (or most recent) time series data. In another example, a temporal change can include passing of a sufficient amount of time (e.g., next second, minute, hour, day, week, month, season, etc.). In another example, a temporal or system change can include a change specific to the forecasting model (e.g., a change in the current time series data array compared to last 5 time series data arrays). In another example, if a system change (e.g., a change in one or more parameter values or covariates) has occurred with respect to the system to which the recent time series data array corresponds, the modeling system (e.g., 108) may retrain the localized temporal model based on the system change. For example, a vehicle traffic scheduling system parameter can include the amount of traffic on one or more vehicle routes. A change in a system parameter could include an increased (or decreased) level of traffic on a route. In another example, a change in a parameter could include a change in the operational mode of a system (e.g., from stopped to running or vice versa). The system change could be determined by a change in one or more values of variables, signals, parameters and/or covariates associated with the system. Another system change that may trigger retraining of the localized temporal model is the occurrence of a new event that is associated with the system. For example, a new event code could be generated by the control system on the locomotive and received by event data 106. The retraining could include repeating one or more of the blocks 302-312 using a new recent time series data array. If a request for a forecast has not been received and/or a temporal or system change has not occurred, processing returns to 314. Blocks 302-312 may be combined, skipped, reordered, or repeated. For example, in some cases, multiple forecasts may be generated using a trained model until the one or more of the retraining criteria are met. In some examples, retraining may be carried out immediately before a forecast is generated.

Figure 4:
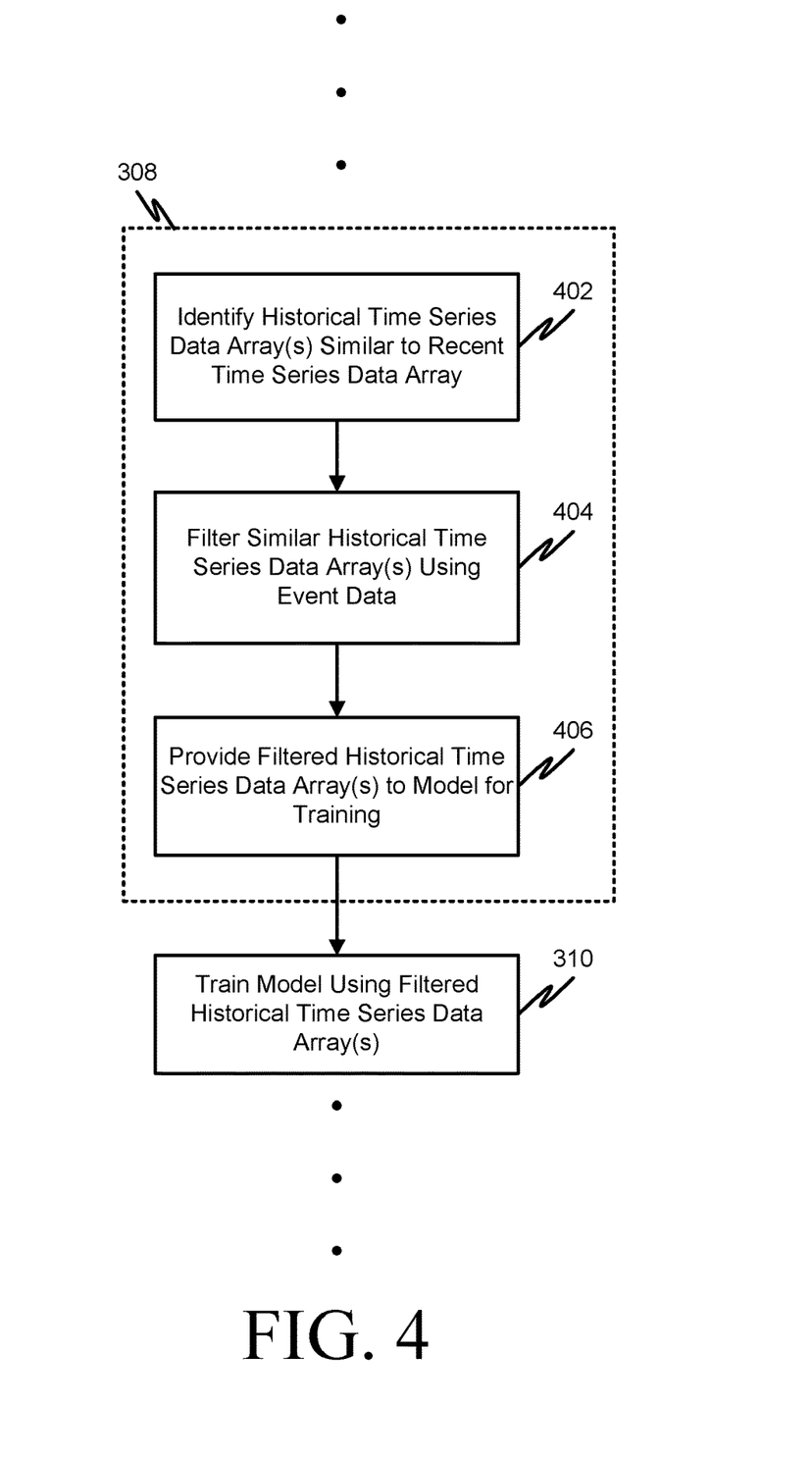
FIG. 4 is a flowchart of an example method for localized temporal modeling showing detail of a greedy learning technique in accordance with at least one implementation.

FIG. 4 is a flowchart of an example method for localized temporal forecasting showing details of selecting historical time series data arrays in accordance with at least one implementation. Processing for 308, selecting one or more historical time series data arrays, begins at 402, where one or more historical time series data arrays similar to the recent time series data array are identified. In some implementations, the matching can include applying a function that calculates pattern overlap between a recent time series data array and time series data arrays from the past history of the system. In some examples, such a function can apply time (longitudinal) and cross-sectional comparisons of data and return a scalar measure of pattern overlap. Further, the function can identify time periods from the past that have high pattern match values. Processing continues to 404.

At 404, historical time series data arrays identified in 402 as being similar to the recent time series data array can be filtered using event data. For example, if the recent time series data array is associated with an event such as a game day for a city having a sports venue where a game is being played, the historical time series data may be filtered to include those historical time series arrays that are similar to the recent time series data array and which occurred during a game day. In another example, the event could be a weather event such as rain or snow. In such a case, the historical time series data arrays could be filtered to include only those historical time series data arrays having a weather event similar to the event associated with the recent time series data array. In another example, the event data could be the receipt of one or more event codes generated by the control system of a locomotive. In such a case, the historical time series data arrays could be filtered to include only those historical time series data arrays that received the same event codes coincident or near in time with the period in time at which the historical time series data were collected. In general, filtering of the historical time series arrays is achieved by matching the occurrence of same event(s) that are associated with recent time series arrays. In addition to matching historical time series arrays that are associated temporally with the same events that are associated with the recent time series array, other characteristics of the event data can be used to further filter the historical time series arrays. For example, if the event associated with the recent data array is occurrence of snow in the past 24 hours, amount of snow that has fallen during that period (e.g., 1 to 3 inches of snow) can be used as an additional condition that must be met by the historical time series arrays. Processing continues to 406.

The filtering of historical time series data arrays based on event data can be important to provide a training data set that has been identified as having similarities to time series data from a recent period of time (e.g., the window of time series data corresponding to the window of recent time series data) and which reflects the effect (if any) of the event. A conventional training process may use all historical time series data arrays to train the model. However, the conventional training set using all historical time series data arrays may include historical data arrays that do not correspond to events associated with the current data array, but are otherwise matched (e.g., recent time series data array corresponds to a "low rain" day during monsoon season, while the historical time series data array corresponds to a "heavy rain" day during dry season that happened to match the recent time series data array). By filtering out such matches, the training data set used for the model may be improved.

At 406, the filtered historical time series data arrays are provided to the localized temporal model for training the model. Processing continues from 308 to 310 as described above.

The localized temporal model is a greedy learning algorithm because it is retrained only when needed (e.g., on an as needed or as requested basis and/or based on a temporal or system change). Retraining the model based on temporal change or system parameter change allows for the model to continuously adapt to recent conditions in time series data and/or event data. Since the localized temporal model is trained with data that are similar to the current system conditions, it is parsimonious in the use of available data. Such techniques may be useful for big data applications (e.g., to generate forecasts for behaviors of systems that generate a large amount of data per time period such as assets, groups of assets, health care facilities, trains, vehicles, weather monitoring systems, scientific computing systems, information gathering systems, distributed systems, etc.).

It will be appreciated that the modules, processes, systems, and/or sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer, mobile device and/or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and asset condition monitoring arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for localized temporal modeling.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

The invention claimed is:

1. A computing system comprising: at least one processor; a non-transitory computer-readable medium; and program instructions stored on the non-transitory computer-readable medium that are executable by the at least one processor to cause the computing system to carry out a method that comprises:
 obtaining a first multivariate time series data array representing values of a set of multiple parameters related to the physical operation of a given asset from a first time represented by at least one timestamp, wherein at least some of the values comprise measurements collected by one or more sensors at the given asset;
 performing a first comparison between the first multivariate time series data array and a set of historical multivariate time series data arrays, wherein each respective historical multivariate time series data array in the set of historical multivariate time series data arrays represents respective past values of the set of multiple parameters related to the physical operation of the given asset from a respective past time represented by at least one timestamp;
 based on the first comparison, identifying a subset of historical multivariate time series data arrays that are similar to the first multivariate time series data array by (i) deriving a respective measure of similarity between the first multivariate time series data array and each respective historical multivariate time series data array in the set of historical multivariate time series data arrays and (ii) identifying the historical multivariate time series data arrays in the set of historical multivariate time series data arrays that have the best respective measures of similarity;

obtaining first event data associated with the first multivariate time series data array, wherein the first event data indicates one or more event occurrences that happened at or near the first time of the first multivariate time series data array;

performing a second comparison between the first event data and respective historical event data associated with each of the subset of historical multivariate time series data arrays, wherein the respective historical event data associated with each respective historical multivariate time series data array in the subset of historical multivariate time series data arrays indicates one or more past event occurrences that happened at or near the respective past time of the respective historical multivariate time series data array;

based on the second comparison, identifying historical multivariate time series data arrays in the subset of historical multivariate time series data arrays that have associated historical event data indicating one or more past event occurrences of a same type as the one or more event occurrences indicated by the first event data and then filtering the subset of historical multivariate time series data arrays down to the identified historical multivariate time series data arrays;

training a time series forecast model by using the identified historical multivariate time series data arrays as training data for a machine learning process that is executed by the computing system to produce the trained time series forecast model, and wherein the machine learning process employs a recurrent neural network and/or support vector regression;

generating a forecast of a future value of at least one parameter of the set of multiple parameters related to the physical operation of the given asset using the trained time series forecast model; and transmitting data indicating the forecast of the future value of at least one parameter to an output system.

2. The computing system of claim 1, wherein the program instructions that are executable by the at least one processor to cause the computing system to carry out the method comprise program instructions that are executable by the at least one processor to cause the computing system to carry out the method in response to one or more of (a) a period of time expiring, (b) receiving a request to generate a forecast, (c) detecting a temporal change, or (d) detecting a change in at least one parameter of the set of multiple parameters.

3. The computing system of claim 1, wherein the one or more event occurrences indicated by the first event data comprise one or more event occurrences that are expected to affect the physical operation of the given asset subsequent to the first time.

4. The computing system of claim 1, wherein one or more of the first time of the first multivariate time series data array or the respective past time of each respective historical multivariate time series data array comprises a range of time.

5. The computing system of claim 1, wherein the given asset comprises one of a transportation machine, an industrial machine, or a utility machine.

6. The computing system of claim 1, wherein the one or more event occurrences indicated by the first event data comprise at least one of (a) an occurrence of a particular type of anomalous condition at the given asset, (b) an occurrence of a particular type of weather event, or (c) an occurrence of a particular type of man-made event.

7. The computing system of claim 1, wherein the first event data and the historical event data comprises event codes.

8. A non-transitory computer-readable medium having program instructions stored thereon that are executable by at least one processor of a computing system to cause the computing system to carry out a method that comprises:

obtaining a first multivariate time series data array representing values of a set of multiple parameters related to the physical operation of a given asset from a first time represented by at least one timestamp, wherein at least some of the values comprise measurements collected by one or more sensors at the given asset;

performing a first comparison between the first multivariate time series data array and a set of historical multivariate time series data arrays, wherein each respective historical multivariate time series data array in the set of historical multivariate time series data arrays represents respective past values of the set of multiple parameters related to the physical operation of the given asset that were collected from a respective past time represented by at least one timestamp;

based on the first comparison, identifying a subset of historical multivariate time series data arrays that are similar to the first multivariate time series data array by (i) deriving a respective measure of similarity between the first multivariate time series data array and each respective historical multivariate time series data array hi the set of historical multivariate time series data arrays and (ii) identifying the historical multivariate time series data arrays in the set of historical multivariate time series data arrays that have the best respective measures of similarity;

obtaining first event data associated with the first multivariate time series data array, wherein the first event data indicates one or more event occurrences that happened at or near the first time of the first multivariate time series data array;

performing a second comparison between the first event data and respective historical event data associated with each of the subset of historical multivariate time series data arrays, wherein the respective historical event data associated with each respective historical multivariate time series data array in the subset of historical multivariate time series data arrays indicates one or more past event occurrences that happened at or near the respective past time of the respective historical multivariate time series data array;

based on the second comparison, identifying historical multivariate time series data arrays in the subset of historical multivariate time series data arrays that have associated historical event data indicating one or more past event occurrences of a same type as the one or more event occurrences indicated by the first event data and then filtering the subset of historical multivariate time series data arrays down to the identified historical multivariate time series data arrays;

training a time series forecast model by using the identified historical multivariate time series data arrays as training data for a machine learning process that is executed by the computing system to produce the trained time series forecast model, and wherein the machine learning process employs a recurrent neural network and/or support vector regression;

generating a forecast of a future value of at least one parameter of the set of multiple parameters related to the physical operation of the given asset using the trained time series forecast model; and transmitting data indicating the forecast of the future value of at least one parameter to an output system.

9. The non-transitory computer-readable medium of claim 8, wherein the program instructions that are executable by the at least one processor to cause the computing system to carry out the method comprise program instructions that are executable by the at least one processor to cause the computing system to carry out the method in response to one or more of (a) a period of time expiring, (b) receiving a request to generate a forecast, (c) detecting a temporal change, or (d) detecting a change in at least one parameter of the set of multiple parameters.

10. The non-transitory computer-readable medium of claim 8, wherein the one or more event occurrences indicated by the first event data comprise one or more event occurrences that are expected to affect the physical operation of the given asset subsequent to the first time.

11. The non-transitory computer-readable medium of claim 8, wherein one or more of the first time of the first multivariate time series data array or the respective past time of each respective historical multivariate time series data array comprises a range of time.

12. The non-transitory computer-readable medium of claim 8, wherein the given asset comprises one of a transportation machine, an industrial machine, or a utility machine.

13. The non-transitory computer-readable medium of claim 8, wherein the one or more event occurrences indicated by the first event data comprise at least one of (a) an occurrence of a particular type of anomalous condition at the given asset, (b) an occurrence of a particular type of weather event, or (c) an occurrence of a particular type of man-made event.

14. The non-transitory computer-readable medium of claim 8, wherein the first event data and the historical event data comprises event codes.

15. A computer-implemented method comprising:
obtaining a first multivariate time series data array representing values of a set of multiple parameters associated with a system related to the physical operation of a given asset from a first time represented by at least one timestamp, wherein at least some of the values comprise measurements collected by one or more sensors at the given asset;
performing a first comparison between the first multivariate time series data array and a set of historical multivariate time series data arrays, wherein each respective historical multivariate time series data array in the set of historical multivariate time series data arrays represents respective past values of the set of multiple parameters related to the physical operation of the given asset from a respective past time represented by at least one timestamp;
based on the first comparison, identifying a subset of historical multivariate time series data arrays that are similar to the first multivariate time series data array by (i) deriving a respective measure of similarity between the first multivariate time series data array and each respective historical multivariate time series data array in the set of historical multivariate time series data arrays and (ii) identifying the historical multivariate time series data arrays in the set of historical multivariate time series data arrays that have the best respective measures of similarity;
obtaining first event data associated with the first multivariate time series data array, wherein the first event data indicates one or more event occurrences that happened at or near the first time of the first multivariate time series data array;
performing a second comparison between the first event data and respective historical event data associated with each of the subset of historical multivariate time series data arrays, wherein the respective historical event data associated with each respective historical multivariate time series data array in the subset of historical multivariate time series data arrays indicates one or more past event occurrences that happened at or near the respective past time of the respective historical multivariate time series data array;
based on the second comparison, identifying historical multivariate time series data arrays in the subset of historical multivariate time series data arrays that have associated historical event data indicating one or more past event occurrences of a same type as the one or more event occurrences indicated by the first event data and then filtering the subset of historical multivariate time series data arrays down to the identified historical multivariate time series data arrays;
training a time series forecast model by using the identified historical multivariate time series data arrays as training data for a machine learning process that is executed by a computing system to produce the trained time series forecast model, and wherein the machine learning process employs a recurrent neural network and/or support vector regression;
generating a forecast of a future value of at least one parameter of the set of multiple parameters related to the physical operation of the given asset using the trained time series forecast model; and transmitting data indicating the forecast of the future value of at least one parameter to an output system.

16. The computer-implemented method of claim 15, wherein the method is carried out in response to one or more of (a) a period of time expiring, (b) receiving a request to generate a forecast, (c) detecting a temporal change, or (d) detecting a change in at least one parameter of the set of multiple parameters.

17. The computer-implemented method of claim 15, wherein the one or more event occurrences indicated by the first event data comprise one or more event occurrences that are expected to affect the physical operation of the given asset subsequent to the first time.

18. The computer-implemented method of claim 15, wherein one or more of the first time of the first multivariate time series data array or the respective past time of each respective historical multivariate time series data array comprises a range of time.

19. The computer-implemented method of claim 15, wherein the given asset comprises one of a transportation machine, an industrial machine, or a utility machine.

20. The computer-implemented method of claim 15, wherein the one or more event occurrences indicated by the first event data comprise at least one of (a) an occurrence of a particular type of anomalous condition at the given asset, (b) an occurrence of a particular type of weather event, or (c) an occurrence of a particular type of man-made event.

* * * * *